United States Patent [19]
Pellet

[11] Patent Number: 5,501,011
[45] Date of Patent: Mar. 26, 1996

[54] METHOD OF MANUFACTURE OF AN ENCLOSURE CONTAINING HOT GASES COOLED BY TRANSPORTATION, IN PARTICULAR THE THRUST CHAMBER OF A ROCKET ENGINE

[75] Inventor: Marc Pellet, Vernon, France

[73] Assignee: Societe Europeenne de Propulsion, Suresnes, France

[21] Appl. No.: 279,973

[22] Filed: Jul. 25, 1994

Related U.S. Application Data

[63] Continuation-in-part of Ser. No. 62,068, May 14, 1993, Pat. No. 5,363,645.

[30] Foreign Application Priority Data

May 18, 1992 [FR] France .................................. 92 06002

[51] Int. Cl.[6] .................................................. B23P 15/00
[52] U.S. Cl. ................................. 29/890.01; 60/752
[58] Field of Search ..................... 29/890.01; 60/752, 60/554, 266, 267, 271; 415/115; 165/907

[56] References Cited

U.S. PATENT DOCUMENTS

| | | | |
|---|---|---|---|
| 2,183,313 | 12/1939 | Goddard | 60/35.6 |
| 3,015,855 | 1/1962 | Merkel | 18/55 |
| 3,557,553 | 1/1971 | Schmitz | 60/39.65 |
| 3,584,972 | 6/1971 | Bratkovich | 416/229 |
| 3,585,800 | 6/1971 | Kuntz et al. | 60/265 |
| 3,798,902 | 3/1974 | Butter | 60/260 |
| 3,910,039 | 10/1975 | Fortini | 60/265 |
| 4,040,767 | 8/1977 | Dierberger et al. | 415/115 |
| 4,118,146 | 10/1978 | Dierberger | 415/115 |
| 5,127,221 | 7/1992 | Beebe | 60/39.02 |
| 5,145,001 | 9/1992 | Valenzuela | 165/907 |
| 5,233,755 | 8/1993 | Vandendriessche | 29/890.01 |
| 5,267,611 | 12/1993 | Rosenfeld | 165/907 |
| 5,371,945 | 12/1994 | Schnoor | 29/890.01 |

Primary Examiner—Irene Cuda
Attorney, Agent, or Firm—Weingarten, Schurgin, Gagnebin & Hayes

[57] ABSTRACT

A method of manufacturing an enclosure containing hot gases cooled by transpiration comprises:

forming a shaped rigid shell comprised of a microperforated sheet metal, hydraulic calibration sheath, welding spacers to an outside face of the hydraulic calibration sheath;

welding an outer sealing envelope on an outside surface of the spacers and the partitions; and forming a porous wall by applying a deposit onto an inside face of the hydraulic calibration sheath.

9 Claims, 6 Drawing Sheets

METHOD OF MANUFACTURE OF AN ENCLOSURE CONTAINING HOT GASES COOLED BY TRANSPORTATION, IN PARTICULAR THE THRUST CHAMBER OF A ROCKET ENGINE

RELATED APPLICATION

This is a continuation-in-part of U.S. patent application Ser. No. 08/062,068, filed May 14, 1993, now U.S. Pat. No. 5,363,645.

FIELD OF THE INVENTION

The present invention relates to transpiration cooling of an enclosure containing hot gases such as a hot gas line, a boiler, or a rocket engine combustion chamber, or a gas generator, or a prechamber.

PRIOR ART

Various systems are already known for cooling porous walls by transpiration.

The flow, known as "transpiration", of a cold fluid from a first face of the porous wall situated adjacent to the cold source towards the second face of the porous wall situated adjacent to the hot source takes place with heat transfer occurring within the porous wall. The porous wall is the seat of two opposite-direction flows of heat: a conduction flow conveyed by the solid matrix; and an advection flow conveyed by the fluid. These two flows interact and exchange power by an exchange mechanism called "transvection" which, at the microscopic pore level, corresponds to peripheral convection of the fluid on contact with the solid matrix. This transfer of heat from the hotter wall to the cooler fluid modifies the two opposing conduction and advection flows. The power extracted from the incident conduction flow is taken up by the advection flow conveyed by the fluid and is returned towards its origin, i.e. the hot source. The conduction flow towards the cold zone is thus reduced by this extraction of power. The intensity of thermo-coupling within the wall between the structural material thereof and the fluid, i.e. the internal heat exchange coefficient, depends on the internal shape of the porous medium, on the nature of the fluid, and on the flow rate.

Transpiration cooling has already been considered for a rocket engine thrust chamber having its wall exposed on one of its faces to the heat flow coming from the combustion while nevertheless needing to be kept at a temperature below the limit acceptable by the material from which it is made and compatible with mechanical strength requirements. When using such transpiration cooling, the cold source is constituted by one of the propellant components at ambient or cryogenic temperature, and the wall of the chamber is made of a porous material that is permeable to the cooling propellant component. The transpiration flow passes through the wall before being rejected into the combustion chamber. As it travels, the fluid takes heat power from the wall and as a result it keeps the wall within an acceptable temperature limit. A second cooling effect is also obtained by the fact that the fluid rejected into the chamber interposes itself between the wall and the combustion proper, thereby setting up an obstacle to the incident heat flow even before it reaches the wall.

Patent documents U.S. Pat. Nos. 3,832,290 and 3,910,039 thus describe a rocket engine combustion chamber including a porous wall with ribs added to its outside face to constitute approximately rectangular fluid-application compartments that are regularly distributed around the entire periphery of the chamber. An outer intermediate wall defines the outside face of the compartments opposite to the porous wall. A single calibrated orifice for feeding cooling fluid is formed in each compartment through the outer intermediate wall so as to match the transpiration flow rate to that required in each compartment. The devices described thus make it possible, to some extent, to match the transpiration cooling flow rate to the various zones of a chamber having an inner wall of constant porosity, however such matching can only be discontinuous from one compartment to another. Furthermore, the manufacture of known combustion chambers capable of enabling transpiration cooling to be implemented requires a large amount of machining, and thus a manufacturing cost that is high.

OBJECT AND BRIEF DESCRIPTION OF THE INVENTION

The present invention seeks to remedy the drawbacks of the above-mentioned transpiration cooling devices for a porous wall and to enable cooling fluid consumption to be optimized to take account of the thermophysical characteristics of the various elements that participate in the transpiration phenomenon (porous wall, incident heat flow, cooling fluid).

More particularly, the invention seeks to simplify the implementation of transpiration cooling systems for the porous wall of an enclosure containing hot gases and to make it easy to provide continuous matching of the cooling conditions through the porous wall over all of the sections of the enclosure, which enclosure may be constituted particularly, but not exclusively, by a rocket engine thrust chamber.

These objects are achieved by a method of manufacturing an enclosure containing hot gases cooled by transpiration comprising:

- forming a shaped rigid shell comprised of a microperforated sheet metal, hydraulic calibration sheath,
- welding spacers to an outside face of the hydraulic calibration sheath;
- welding an outer sealing envelope on an outside surface of the spacers and the partitions; and
- forming a porous wall by applying a deposit onto an inside face of the hydraulic calibration sheath.

In an implementation that is cheap and advantageous, the step of forming rigid shell comprises

- cutting out shapes from the sheet metal and welding them together to form shell rings,
- welding together the shell rings so as to define the hydraulic calibration sheath whose shape corresponds to that of the chamber to be made, and
- cutting the hydraulic calibration sheath with a laser to form the microperforations with varying local perforation densities.

The spacers and partitions are made from plane sheet metal, are cut out into annular sectors, and are then welded into place on the hydraulic calibration sheath, optionally after being initially folded.

The outer sealing envelope is made according to the steps of cutting shapes out from a plane metal sheet so as to form envelope rings, and welding the envelope rings to the spacers secured to the hydraulic calibration sheath, the outer sealing envelope being welded blind onto the spacers.

In another variant implementation, applicable when the hydraulic calibration sheath is manufactured before the porous wall, the hydraulic calibration sheath and the outer sealing envelope are made by superplastic deformation, to take up the shape of two half-shells that are made separately and subsequently welded together.

In a preferred implementation in which the porous wall is manufactured after the hydraulic calibration sheath, the porous wall is fabricated according to powder metallurgy techniques using the hydraulic calibration sheath as an outer matrix, which sheath is secured to the outer sealing envelope by the spacers, and by using a two-part mandrel as the inner matrix, the fabrication comprising:

filling a molding volume in which the porous wall is to be formed with a granular mixture constituted by spherical micro-beads of metal accompanied by grains of brazing material of an interstitial size, and heating the assembly to cause the brazing material to melt and form bridges between the micro-beads.

In another possible implementation, the step of forming the porous wall is made initially, followed by the steps of applying the hydraulic calibration sheath to an outside face of the porous wall by hot resilient deformation, attaching spacers to the outside face of the hydraulic calibration sheath, and affixing the outer sealing envelope on the outside surfaces of the spacers.

In yet another possible implementation, the step of forming the porous wall is made initially, followed by the steps of attaching sticking flexible elements having microperforations onto the outside face of the porous wall to form hydraulic calibration sheath, disposing spacers on the outside of the hydraulic calibration sheath by inserting said spacers through the sheath into the porous wall, and affixing the outer sealing envelope on the outside surfaces of the spacers.

According to a particular embodiment, the hydraulic calibration sheath and the outer sealing envelope are made by hydroforming to take up the shape of two half-shells that are made separately and subsequently welded together.

According to another particular embodiment, the step of welding spacers to the outside face of the hydraulic calibration sheath further includes welding partitions to the outside face of the hydraulic calibration sheath.

The invention is applicable to various types of enclosure such as ducts for transporting hot gases, boilers, combustion chambers, gas generator chambers, prechambers, or rocket engine thrust chambers.

It may be observed that in an application to a rocket engine where the cooling fluid is constituted by one of the propellant components, the invention makes it possible to achieve complete decoupling between the cooling system and the main propellant injection system.

In particular, compared with cooling systems having conservative propellant component flow between double walls, this makes it possible:

to separately control the flow rates sent through the cooling system and through the injection system, thereby making it possible to optimize these two functions, in particular by varying the cooling flow rate as a function of different stages of flight, and for example by providing a cooling flow rate which is greater on ignition and which diminishes progressively thereafter so as to reduce the thermal shock inflicted on the wall, thereby increasing its lifetime; and for a given burn pressure, to reduce the maximum propellant pressure required at the outlet from the pumping system because the hydraulic resistances of the cooling system and of the injection system are in parallel and not in series, thereby contributing to mass savings and to reducing complexity in the pump that feeds propellant.

The invention makes it possible, in particular, to use only one cooling system within a rocket engine, both for the convergent portion constituted by the combustion chamber and the throat of the nozzle and for the divergent portion of the nozzle, while nevertheless flexibly adapting cooling conditions throughout the thrust chamber, and in general reducing manufacturing and operating costs for equal performance compared with other known systems.

The presence of spacers between the hydraulic calibrating sheath and the outer sealing envelope contributes to maintaining the spacing between these two elements while also improving the stiffness of the assembly and making it possible to transfer mechanical forces in the divergent portion of the nozzle, thus avoiding any risk of the bottom end of the divergent portion buckling. The presence of partitions reinforces this effect while making it possible to improve the conditions under which transpiration flow rate is matched to the various zones of the propulsion chamber.

BRIEF DESCRIPTION OF THE DRAWINGS

Other characteristics and advantages of the invention appear from the following description of particular embodiments, given with reference to the accompanying drawings, in which.

DETAILED DESCRIPTION OF PARTICULAR EMBODIMENTS

Figure 1:
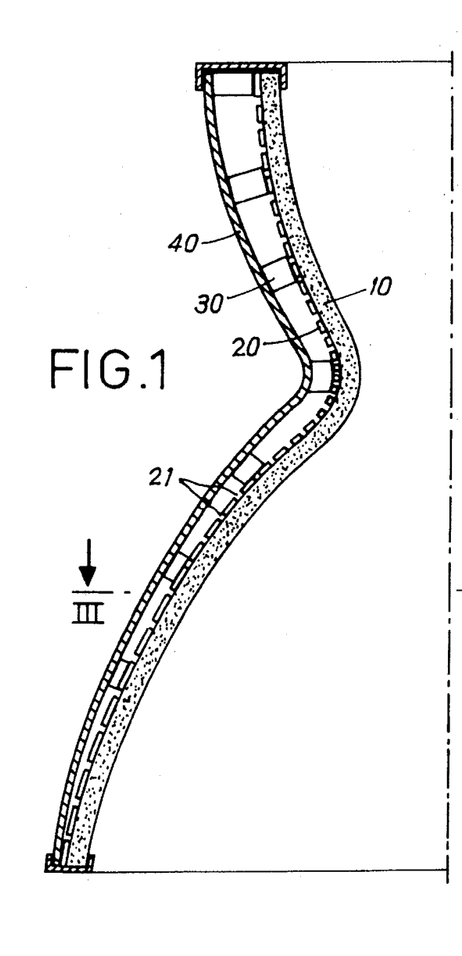
FIG. 1 is an axial half-section through a particular embodiment of a transpiration cooling device of the invention applied to a rocket engine combustion chamber.
Figure 2:
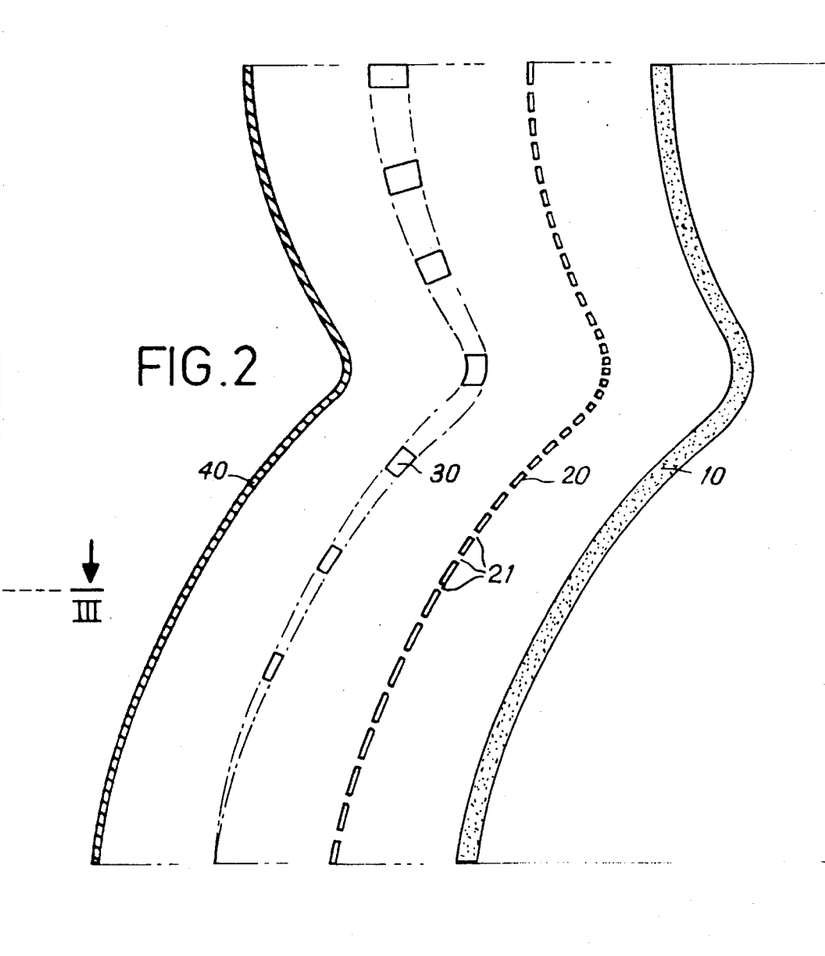
FIG. 2 is an exploded view of the FIG. 1 embodiment.
Figure 3:
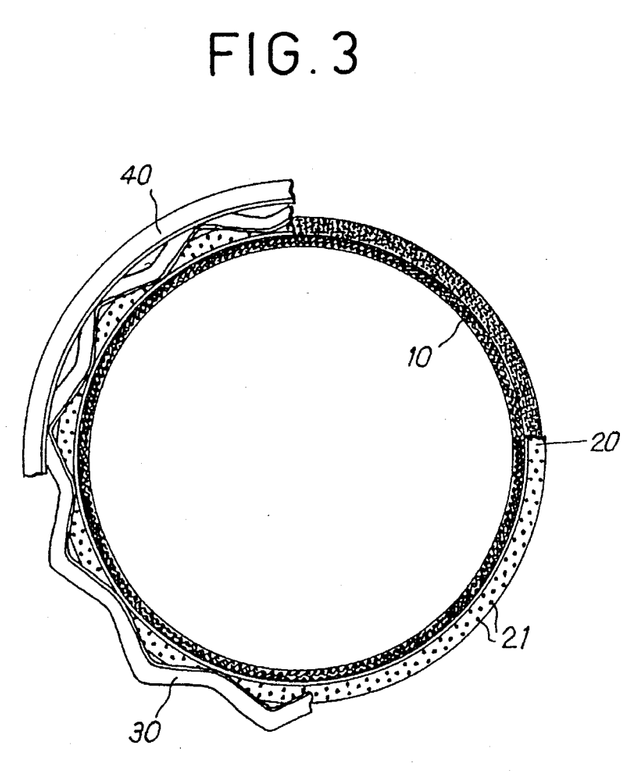
FIG. 3 is a progressively stripped-down section view on line III—III of FIG. 1.

Reference is made initially to FIGS. 1 to 3 which, by way of example, show an enclosure containing hot gases and constituted by a thrust chamber of a rocket engine.

The internal portion of the combustion chamber which comes into contact with the hot gas flow comprises a porous wall 10 which serves both as a conventional nozzle confining the flow of combustion gases within the inside volume defined by said convergent-divergent shaped circularly symmetrical wall, and also enables heat exchange to be performed between the heat flow coming from the combustion gases and the cooling fluid applied to the outside face of the porous wall 10 for the purpose of "transpiring" through said wall.

The porous wall 10 is of permeable structure, is about 1 millimeter (mm) to 2 mm thick, and has a grain size that may lie in the range about 10 microns (μm) to 100 μm, for example.

The porous wall 10 may be made of sintered copper for example or of some other metal implemented by power metallurgy using micro-beads.

In accordance with the invention, a hydraulic calibration sheath 20 having a shape that is identical to that of the porous wall 10 defining the combustion chamber, and having a thickness of a few tenths of a millimeter is applied to the outside surface of the porous wall 10.

The hydraulic calibration sheath 20 which is made of a material that is proof to the cooling fluid may be constituted, for example, by a metal foil and it is perforated by a multiplicity of microperforations 21 that are distributed over the entire area of said sheath 20. The sheath 20 is applied to the outside surface of the porous wall 10 in such a manner as to ensure that transpiration is possible through the holes, only.

The dimensioning and the material chosen for said sheath are such that the sintering stress created by the differential expansion between the sheath and the wall when operating at high temperature is quite acceptable. The cooling fluid is then preferably a cryogenic fluid, and may either be one of the propellant components, or else another fluid contained in a special tank and driven by a special pump.

The purpose of the sheath 20 is to adjust the transpiration flow rate locally so as to obtain overall optimization of cooling fluid consumption.

The microperforations 21 are of unequal size and/or density and they are distributed in such a manner that in any given zone of the wall 10 the transpiration area through the porous wall 10 as offered by the holes 21 in the sheath 20 increases with increasing heat flow reaching the wall in said zone. For example, and as shown in FIGS. 1 and 2, the microperforations 21 may be denser around the throat of the nozzle.

The microperforations 21 are shown on an exaggerated scale in the figures to make them easier to see, and they may be very small in fact, e.g. a few tens of microns, and they are of a shape such that the slightly larger beards cannot pass through them.

As can be seen in FIG. 1, an annular chamber for feeding a cooling propellant component is defined between the hydraulic calibration sheath 20 and an outer sealing envelope 40 which contributes to confining the cooling fluid, which fluid may be a propellant component such as liquid hydrogen, for example, and the outer envelope 40 contributes to overall mechanical strength. The transverse size of the annular chamber may be of the order of a few millimeters, for example.

The overall shape of the outer sealing envelope 40 is similar to that of the nozzle, having a convergent portion and a divergent portion. The thickness of the outer envelope 40 may be of the order of 1 or several millimeters and it co-operates with spacers 30 that are situated inside the annular feed chamber and that connect together the hydraulic calibration sheath 20 and the outer sealing envelope 40. The spacers 30 may be made, for example, in the form of scalloped collars (FIG. 3) and they absorb the pressure of the transpiration fluid, thereby serving, in particular, to avoid any risk of the bottom end of the diverging portion buckling. If the spacers are close enough together, the porous inner wall and the outer wall may be relatively thin. The thickness of said walls may also vary from zone to zone. It is also possible to implement the spacers in the form of section members, e.g. H section members, and to dispose them radially, i.e. perpendicularly to the sheath 20.

FIG. 1 shows an annular chamber for feeding a cooling propellant component and that has a volume whose flow section varies so as to maintain a substantially constant speed for the propellant component, thereby obtaining fluid feed with substantially constant dynamic pressure along the entire length of the sheath 20, so that it is only the varying density of microperforations 21 that serves to provide local control of flow rate per unit area in the various zones of the wall 10 against which the sheath is pressed, thus making it possible to vary local flow rate per unit area quite progressively.

In the embodiment of FIGS. 1 to 3, the cooling propellant component is injected into the top of the annular feed chamber such that the cross-section of said annular feed chamber is greatest at the top end of the combustion chamber and falls off progressively towards the bottom end of the diverging portion.

With reference now to FIGS. 4 to 12, a second embodiment can be seen in which fluid-tight partitions 50 are disposed in planes that are substantially perpendicular to the porous wall 10 and to the axis of the nozzle, which partitions are disposed between pairs of spacers 31 and 32 at different levels along the thrust chamber between the hydraulic calibration sheath 20 and the outer sealing envelope 40.

Figure 4:
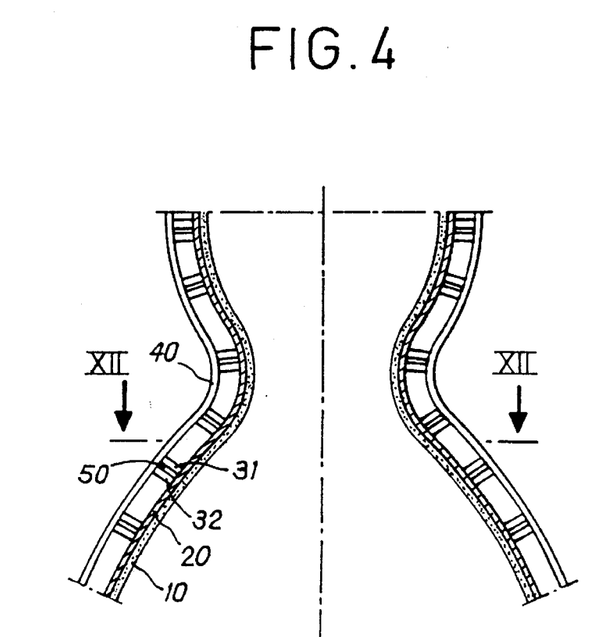
FIG. 4 is a diagrammatic axial section view through a second embodiment of the invention showing the implementation of separation partitions in the feed volume for the cooling propellant component.
Figure 5:
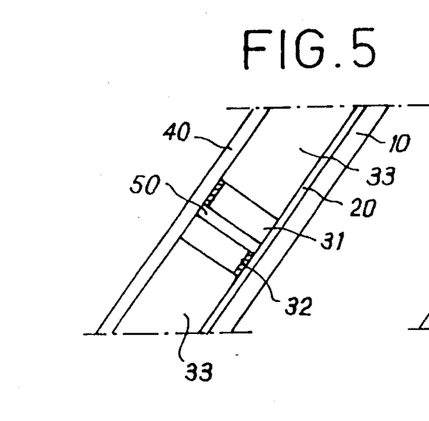
FIG. 5 is a detailed view of FIG. 4 on a larger scale and showing one example of a separation partition and spacers.
Figure 6:
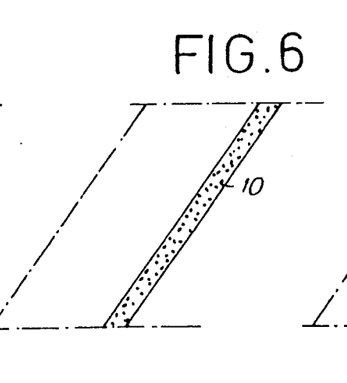
FIGS. 6 to 11 show different stages in a particular method of implementing an enclosure of the invention as shown with reference to the partition portion of FIG. 5.
Figure 7:
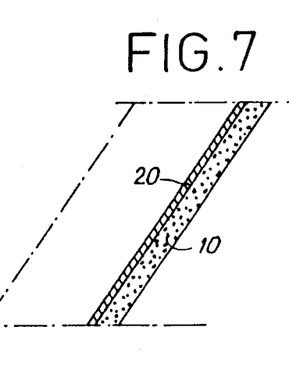
Figure 8:
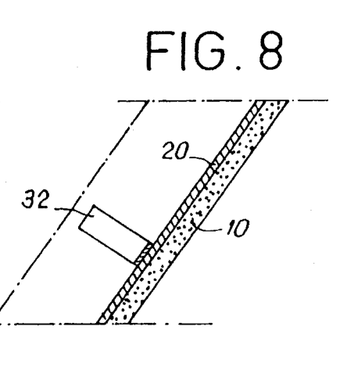
Figure 9:
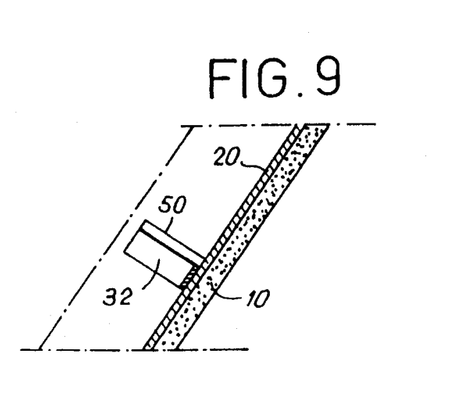
Figure 10:
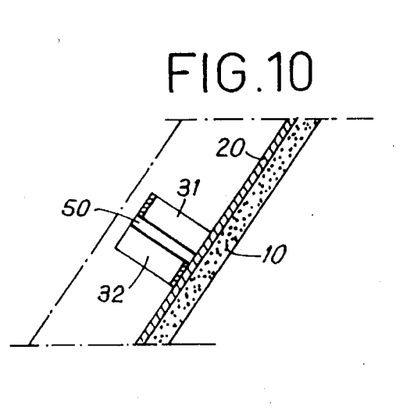
Figure 11:
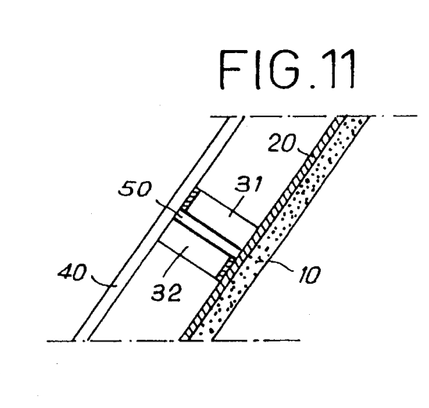
Figure 12:
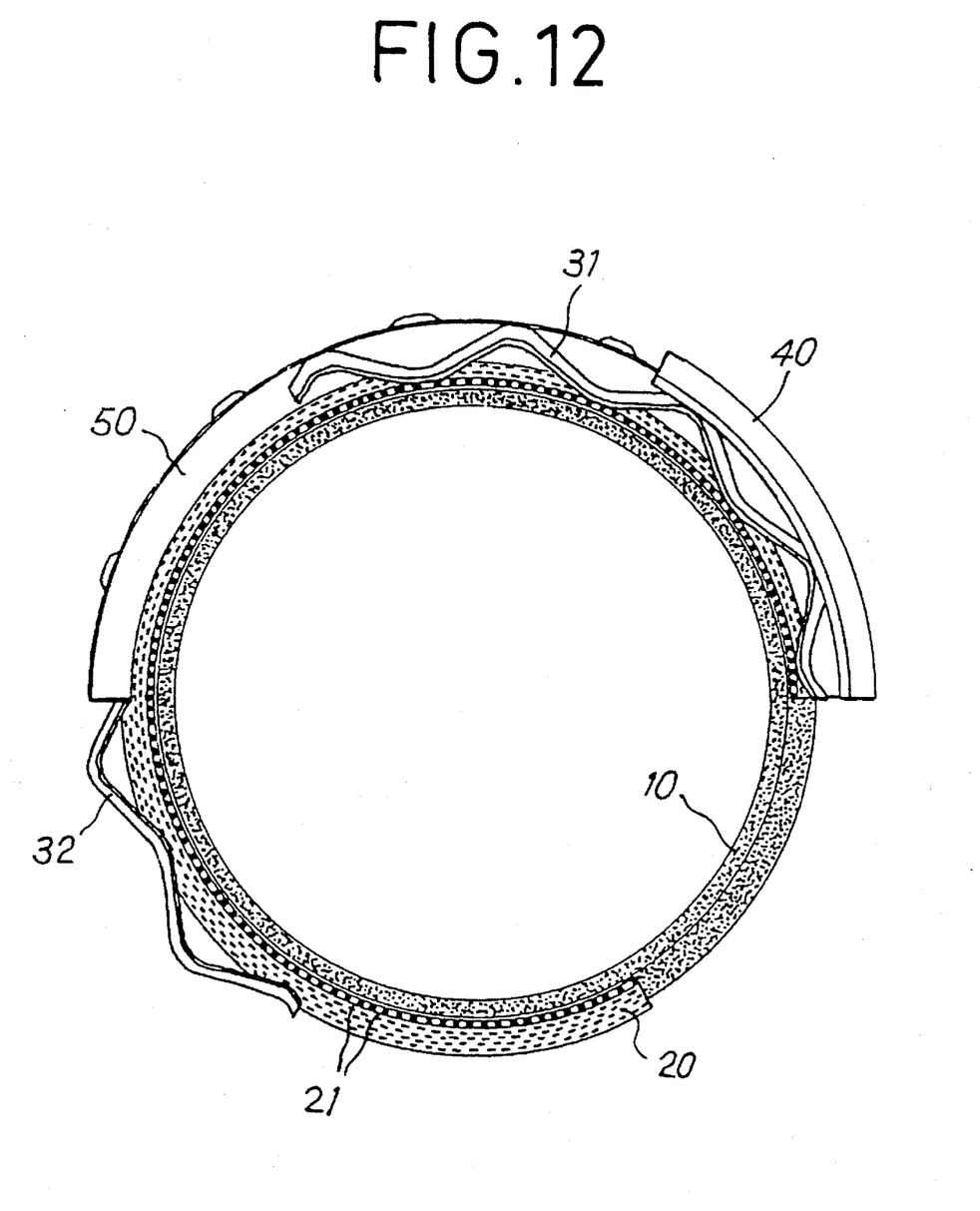
FIG. 12 is a progressively stripped-down view of a second embodiment of the invention in section on line XII— XII of FIG. 4.
Figure 13:
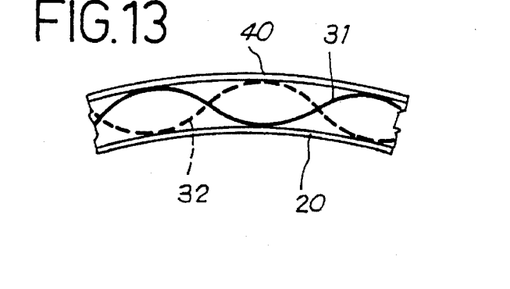
FIGS. 13 and 14 are an elevation view and a section view of a portion of the partition-spacer assembly disposed between the outer sealing wall and the inner calibration wall.
Figure 14:
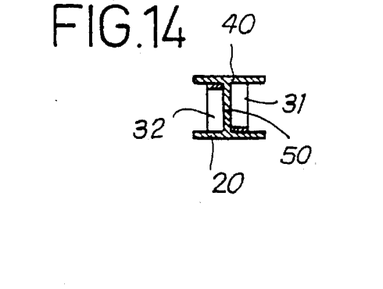
Figure 15:
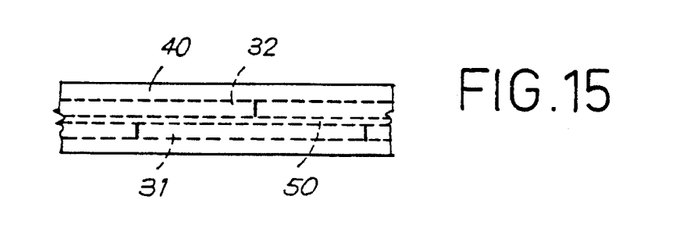
FIGS. 15 and 16 are projections of FIG. 13 respectively onto the outer envelope and onto the hydraulic calibration sheath, showing the welded bonds of the spacers and a partition with said elements.
Figure 16:
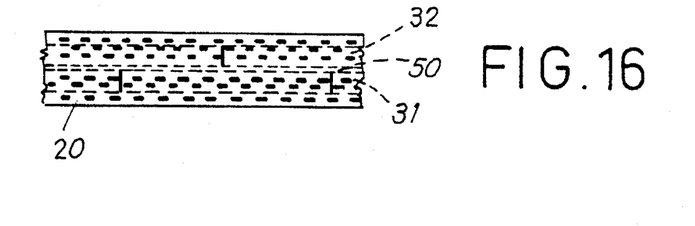

Like the spacers 31 and 32, the partitions 50 contribute to stiffening the overall structure, but they serve above all to define a plurality of annular compartments 33 within the annular fluid feed chamber, which compartments are at different pressures and are stated along the thrust chamber so as to enable better matching to be achieved relative to the pressures created inside the thrust chamber by the hot gases acting on the corresponding; zones of the porous wall 10. The local flow rate per unit area of cooling fluid applied to the porous wall 10 through the sheath 20 naturally continues to be controlled within each feed compartment by the density of microperforations, which density may itself vary within each compartment 33.

The embodiment having partitions 50 defining a plurality of cooling fluid feed compartments 33 outside the hydraulic calibration sheath thus provides greater flexibility in controlling the transpiration cooling process.

Each of the compartments 33 separated by the partitions 50 may have fluid fed thereto internally by the various compartments communicating with one another via calibrated expansion orifices. However, such an embodiment does not allow for separate adjustment of the feed rates to each of the various compartments 33.

Figure 17:
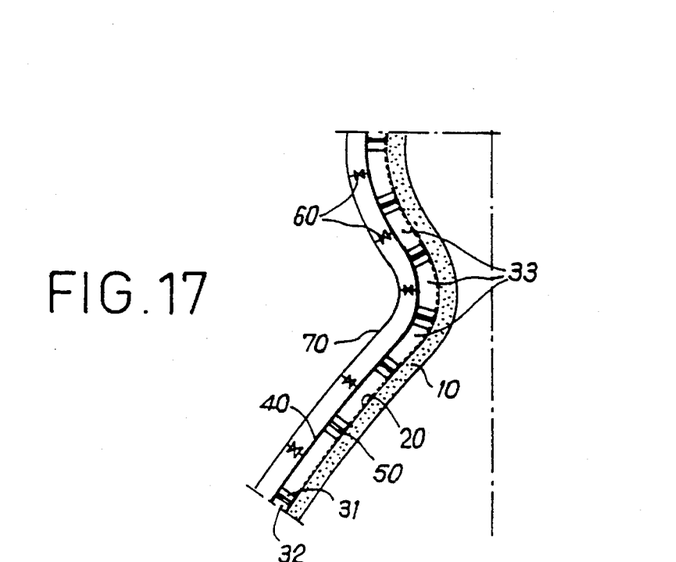
FIG. 17 is an axial half-section view of a rocket engine combustion chamber fitted with a cooling device of the invention, with partitions for separating the propellant component feed volume and with individual fluid feed means for each of the compartments of said feed volume.

Thus, as shown in FIG. 17, each of the compartments 33 may be fed with fluid externally to the sealing envelope 40 via feed lines 70 each of which can feed fluid into a corresponding compartment 33 in appropriately matched manner via flow rate distribution devices such as individual valves 60.

The ducts feeding cooling propellant component, the flow rate distributing devices, and the annular feed chamber may take up various different configurations for the purpose of optimizing the flow rate passing through the hydraulic calibration sheath 20 in the various different zones of the propulsion chamber, with the sheath 20 itself providing fine control of the flow rate per unit area for the transpiration fluid passing through the porous wall 10 in all of the zones of the propulsion chamber.

By way of example, the cooling system of the invention may consume 5% to 10% of the total propellant component flow rate, when the fuel is hydrogen and the temperature of the wall is 700 K.

Under such conditions, the flow of heat through the wall may lie in the range 10 megawatts per square meter (MW/$m^2$) at the outlet from the diverging portion and 60 MW/$m^2$ at the throat, with the head loss through the wall being of the order of a few millibars and with the flow rate per unit area being of the order of 1 kg/$m^2$ per second.

Various methods of manufacturing an enclosure such as a rocket engine thrust chamber implementing the transpiration cooling system of the invention are now described by way of example.

In a first method of manufacture, the porous wall 10 which may be made of sintered materials, for example, is previously implemented using conventional techniques so as to constitute a core on which the hydraulic calibration sheath 20 is disposed.

In a first implementation, the sheath is applied to the wall 10 by elastic deformation when hot. It may be observed that in operation the porous wall 10 is always hotter than the sheath 20 which is cooled by the transpiration liquid. It is thus easy to obtain the desired banding or hooping stress when hot.

In another variant embodiment, the sheath 20 is made up of flexible elements stuck onto the porous wall 10. In which case the sheath 20 may be made up of cut-out elements, or it may be made from a tape that is wound on the wall, providing the shape of the propulsion chamber makes that possible.

The spacers 30, 31, and 32, the partitions 50, and the outer sealing envelope 40, together with devices for ducting and distributing the flow in the feed volume may then be put into place on the base assembly constituted by the porous wall 10 fitted with its sheath 20 in the same manner as in the embodiments described below where said elements are mounted on the sheath only. One example of an assembly sequence in accordance with the invention is shown in FIGS. 6 to 11 which show the successive operations on a length of chamber such as that shown in FIG. 5.

In a second type of manufacturing method, the hydraulic calibration sheath 20 is made in an initial step and constitutes a rigid shell having the porous wall 10 subsequently formed on the inside face thereof.

Under such circumstances, the sheath 20 may be formed by hydroforming or by superplastic deformation. However, such methods can give rise to internal stresses that subsequently need to be eliminated.

Thus, in a preferred implementation, the sheath 20 is made from a plane metal foil which is used for manufacturing frustoconical rings by the techniques of cutting out and welding, which rings are subsequently welded together so as to make up the final converging and diverging shape. Such a method constitutes a solution that is cheap and that has the advantage of not giving rise to internal stresses.

The microperforations 21 may be formed through the sheath 20 by laser cutting, for example. Perforation density for a given drilling pattern is established experimentally. The microperforations 21 may advantageously be elongate in shape, e.g. in the form of rectangular slots (FIGS. 22 to 25) so as to prevent them being closed by spherical micro-beads 11 when the porous wall 10 is made of sintered material. Under such circumstances, the size of the spherical micro-beads 11 must be slightly greater than the small dimension of the slots 21.

Figure 22:
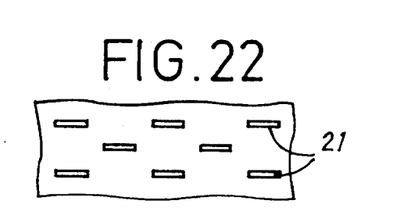
FIGS. 22 and 23 show implementations of elongate microperforations formed through a hydraulic calibration sheath of a cooling device of the invention.
Figure 23:
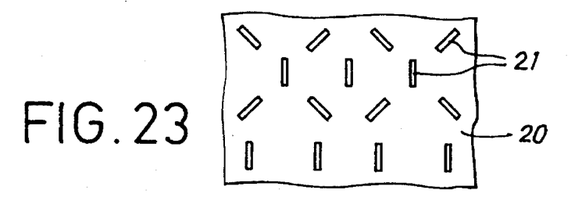
Figure 24:
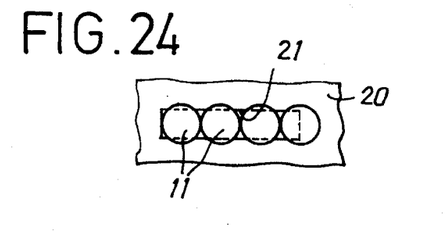
FIGS. 24 and 25 are sections in two perpendicular planes showing how the micro-beads in a porous wall cooperate with the microperforations in a hydraulic calibration sheath pressed against the porous wall in accordance with the invention.
Figure 25:
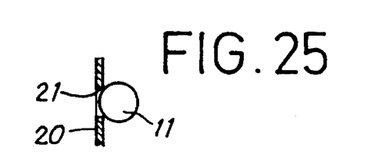

The microperforations 21 may be disposed in patterns that are ordered to a greater or lesser extent (FIGS. 22 and 23). The density of perforations 21, their orientation to some extent, and their size may be adapted to match the flow rate per unit area to that required in the various different zones of the propulsion chamber. These parameters depend on the heat flow to which the porous wall is subjected in the zone under consideration and on the pressure difference between the propellant component feed compartment 33 and the combustion chamber.

A laser drilling method is capable under all circumstances of providing a wide range of configurations.

The spacers 31 and 32, and the partitions 50 are made from plane sheet metal cut out into angular sectors, and prefolded for the spacers 31 and 32, which spacers are advantageously in the form of scalloped collars that are subsequently welded into place on the hydraulic calibration sheath 20.

FIGS. 6 to 11 show a spacer 32 being put into place, followed by a partition 50, and then a second spacer 31, prior to implementing the outer envelope 40, and in this case the sheath 20 is already formed on the inner wall 10, however the process is the same if the sheath 20 is initially formed on its own in the form of a rigid shell. FIGS. 13 to 16 also show the zones where the spacers 31 and 32 and a partition 50 are welded to the perorated sheath 20 and then to the outer envelope 40.

The outer sealing envelope 40 may be made using methods identical to those used for the sheath 20.

When superplastic deformation or hydroforming are used, two half-shells are made separately and they are then welded together.

The cheapest solution which is also suitable for robot manufacture is constituted by a method of assembling together frustoconical rings obtained by cutting out shapes from a plane foil.

It may be observed that the spacers 31 and 32 and the partitions 50 are welded blind to the envelope 40 after the envelope 40 has been put into place, with the positions of the spacers being detected ultrasonically, for example.

Once the assembly constituted by the sheath 20, the envelope 40, the spacers 31, 32, and the partitions 50 have been assembled, the porous wall 10 is formed by applying a deposit on the inside of the sheath 20, which may be done by plasmaforming or by a powder metallurgy technique, for example.

By way of example and with reference to FIGS. 18 to 21, there follows a description of the manufacture of the transpiration porous wall 10 in a disposition that makes use of a mold volume previously made firstly from an outer matrix constituted by a previously manufactured and fitted-out hydraulic calibration sheath 20 and a two-part inner mandrel 101, 102 disposed facing the convergent portion and the divergent portion respectively.

Figure 18:
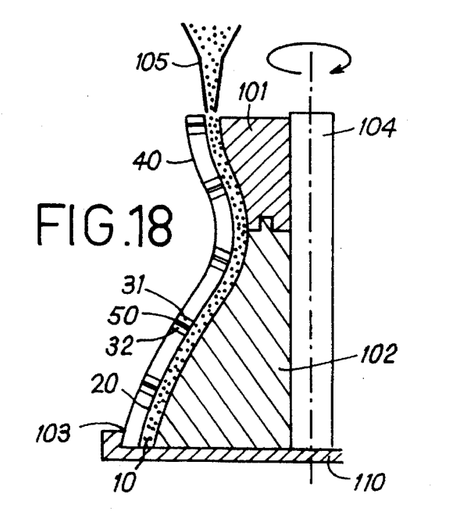
FIG. 18 is an axial half-section showing one example of an installation for manufacturing a porous wall for a rocket engine combustion chamber fitted with a transpiration cooling device of the invention.

The assembly is positioned by means of a tool 110 having annular grooving 103 for positioning the outer matrix and a central hub 104 for positioning the two portions 101 and 102 of the mandrel (FIG. 18).

Figure 21:
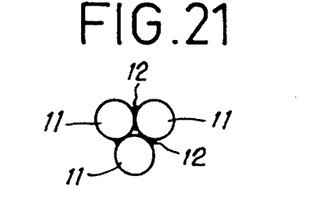
FIG. 21 shows one example of bonding between microbeads within a porous wall to which the invention is applicable.

The mold volume is filled from a hopper 105 with a granular mixture constituted by spherical micro-beads 11 of a metallic material accompanied by interstitial-sized grains of brazing material 12 (FIG. 21).

Figure 19:
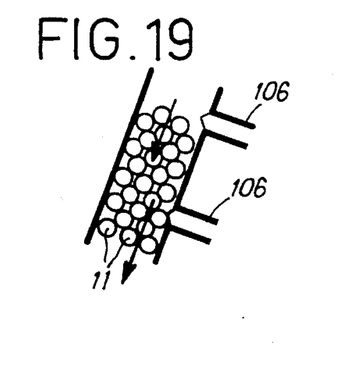
FIG. 19 is a detail view of a micro-bead feed device suitable for use with the device of FIG. 18.
Figure 20:
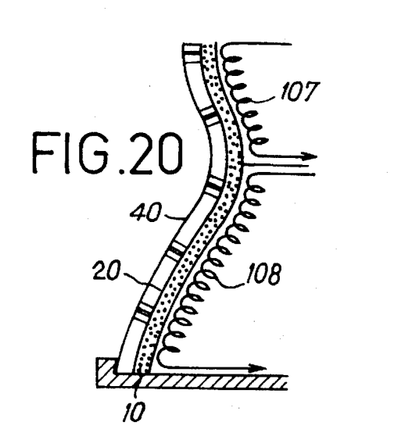
FIG. 20 is an axial half-section view through the FIG. 18 device during a subsequent stage of manufacture.

In order to achieve maximum filling of the mold volume, the entire device may be vibrated by means of the tool 110, or else it may be rotated, with helical grooving 106 constituting an Archimedes' screw system optionally being formed on the mandrel 101, 102 so as to enhance micro-bead advance and enhance contact between micro-beads and the brazing material 12 (FIG. 19).

The assembly is then heated so as to melt the brazing material that forms bridges of material 12 between the micro-beads 11.

Heating may be performed by inserting the assembly in a furnace or by means of heating resistances 107, 108 placed inside the mandrel 101, 102 (FIG. 20), which constitutes a method that is quicker and cheaper from the energy point of view.

During a final step, one or more flanges are installed for attachment to cooling fluid feed lines.

I claim:

1. A method of manufacturing an enclosure containing hot gases cooled by transpiration comprising:

forming a rigid shaped shell comprised of a microperforated sheet metal hydraulic calibration sheath, welding spacers to an outside face of the hydraulic calibration sheath;

welding an outer sealing envelope on an outside surface of the spacers; and forming a porous wall by applying a deposit onto an inside face of the hydraulic calibration sheath.

2. The method according to claim 1, wherein the step of forming the rigid shell comprises:

cutting out shapes from sheet metal and welding the shapes together to form shell rings, welding together the shell rings so as to define the hydraulic calibration sheath whose shape corresponds to that of the enclosure to be made, and cutting the hydraulic calibration sheath with a laser to form microperforations with varying local perforation densities.

3. The method according to claim 1, wherein the outer sealing envelope is made according to the steps of cutting shapes out from a plane metal sheet so as to form envelope rings, and welding the envelope rings to the spacers secured to the hydraulic calibration sheath, with the outer sealing envelope being welded blind onto the spacers.

4. The method according to claim 1, wherein the hydraulic calibration sheath and the outer sealing envelope are made by superplastic deformation, to take up a shape of two half-shells that are separately and subsequently welded together.

5. The method according to claim 1, wherein the porous wall is fabricated according to powder metallurgy techniques using the hydraulic calibration sheath as an outer matrix, which sheath is secured to the outer sealing envelope by the spacers, and by using a two-part mandrel as an inner matrix, the formation comprising:

filling a molding volume in which a porous wall is to be formed with a granular mixture constituted by spherical micro-beads of metal accompanied by grains of brazing material of an interstitial size, and heating the mixture to cause the brazing material to melt and form bridges between the micro-beads.

6. The method according to claim 1, wherein the step of forming the porous wall is made initially, followed by the steps of applying the hydraulic calibration sheath to an outside face of the porous wall by hot resilient deformation, attaching spacers to the outside face of the hydraulic calibration sheath, and affixing the outer sealing envelope on the outside surfaces of the spacers.

7. The method according to claim 1, wherein the step of forming the porous wall is made initially, followed by the steps of attaching flexible elements having microperforations onto the outside face of the porous wall to form the hydraulic calibration sheath, disposing spacers on the outside face of the hydraulic calibration sheath by inserting said spacers through the sheath into the porous wall, and affixing the outer sealing envelope on the outside surfaces of the spacers.

8. The method according to claim 1, wherein the hydraulic calibration sheath and the outer sealing envelope are made by hydroforming to take up a shape of two half-shells that are made separately and subsequently welded together.

9. The method according to claim 1, wherein the step of welding spacers to the outside face of the hydraulic calibration sheath further includes welding partitions to the outside face of the hydraulic calibration sheath and the step of welding an outer sealing envelope on an outside surface of the spacers includes the step of welding the outer sealing envelope on the partitions.

* * * * *

UNITED STATES PATENT AND TRADEMARK OFFICE
CERTIFICATE OF CORRECTION

PATENT NO. : 5,501,011
DATED : March 26, 1996
INVENTOR(S) : Marc Pellet

It is certified that error appears in the above-indentified patent and that said Letters Patent is hereby corrected as shown below:

On the title page, item [54] and column 1, line 3, "TRANSPORTATION" should read --TRANSPIRATION--.

Column 6, line 15, "beards" should read --beads--.

Column 7, line 8, "corresponding;" should read --corresponding--.

Signed and Sealed this

Thirtieth Day of September, 1997

Attest:

BRUCE LEHMAN

Attesting Officer

Commissioner of Patents and Trademarks